United States Patent [19]

Tsujimoto

[11] Patent Number: 5,524,125
[45] Date of Patent: Jun. 4, 1996

[54] INTERFERENCE CANCELLATION APPARATUS CAPABLE OF ADAPTIVE EQUALIZATION AND INTERFERENCE CANCELLATION AT A HIGH SPEED ON FADING DIVERSITY CHANNELS

[75] Inventor: Ichiro Tsujimoto, Tokyo, Japan

[73] Assignee: NEC Corporation, Tokyo, Japan

[21] Appl. No.: 265,754

[22] Filed: Jun. 27, 1994

[30] Foreign Application Priority Data

Jun. 25, 1993 [JP] Japan ................................... 5-155439

[51] Int. Cl.$^6$ ....................................................... H04B 7/10
[52] U.S. Cl. .......................... 375/347; 375/232; 375/233; 455/278.1
[58] Field of Search ..................................... 375/347, 346, 375/232, 233; 455/273, 275, 276.1, 278.1

[56] References Cited

U.S. PATENT DOCUMENTS

| | | | |
|---|---|---|---|
| 4,281,411 | 7/1981 | Bonn et al. | 375/233 |
| 5,349,609 | 9/1994 | Tsujimoto | 375/347 |
| 5,425,059 | 6/1995 | Tsujimoto | 375/347 |

OTHER PUBLICATIONS

"MMSE Equalization of Interference on Fading Diversity Channels", by Peter Monsen, Transactions on Communications, Vo. COM–32, No. 1, Jan. 1984.

"Adaptive Matched Filter and its Significance to Anti–Multipath Fading", by Kojiro Watanabe, C&C Systems Research Laboratories pp. 46.21.1–46.2.5.

*Primary Examiner*—Stephen Chin
*Assistant Examiner*—Huong Luu
*Attorney, Agent, or Firm*—Sughrue, Mion, Zinn, Macpeak & Seas

[57] ABSTRACT

In an interference cancellation apparatus for use in combination with a diversity receiving system, the apparatus includes first and second transversal filters, first and second tap gain controllers, third transversal filter, third tap gain controller, decision unit, first error producing subtractor, and second subtractor which are operable as a first MMSE control loop for controlling first and second controllable tap gains and third controllable tap gains with reference to a first error signal. The apparatus further includes diversity combiner which is operable as a second MMSE control loop for controlling a combined signal with reference to a difference between the combined signal and a decision signal. An adaptive equalization and an interference cancellation are processed in parallel by the first and the second MMSE control loops, so that the control of the adaptive equalization and the interference cancellation can be converged at a high speed.

6 Claims, 3 Drawing Sheets

INTERFERENCE CANCELLATION APPARATUS CAPABLE OF ADAPTIVE EQUALIZATION AND INTERFERENCE CANCELLATION AT A HIGH SPEED ON FADING DIVERSITY CHANNELS

BACKGROUND OF THE INVENTION

This invention relates to an interference cancellation apparatus, particularly to an interference cancellation apparatus for use in cancelling interfering waves and adaptively equalizing multi-pass distortion, when subjected to broadband interfering waves on fading diversity channels.

In general, such an interference cancellation apparatus is for use in combination with a diversity receiving system which has a plurality of diversity routes. The apparatus is operable as a decision feedback equalizer (DFE) which is supplied with diversity reception signals corresponding to the diversity routes to produce an equalized signal.

A conventional interference cancellation apparatus comprises first and second transversal filters each of which has a plurality of controllable taps and which filter the first and the second diversity reception signals into first and second transversal filtered signals in accordance with first and second controllable tap gains, respectively, first and second tap gain controllers for controlling the first and the second controllable tap gains with reference to an error signal and a distributed signal distributed in each one of the taps in accordance with a predetermined adaptive algorithm, third transversal filter which has a plurality of taps and which filters a decision signal into a third transversal filtered signal in accordance with third controllable tap gains, third tap gain controller for controlling the third controllable tap gains with reference to the error signal and a distributed signal distributed in each tap in accordance with the predetermined adaptive algorithm, a decision unit for detecting a level of the equalized signal to decide a decision level for the equalized signal and to produce a decision signal representative of the decision level to supply the decision signal to the third transversal filter, an error producing unit for producing the error signal which is indicative of a difference between a subtracted signal and the decision signal and which is supplied to the first, the second, and the third tap gain controllers, a subtractor for subtracting the third transversal filtered signal from a combined signal to supply the subtracted signal to the decision unit and the error producing unit, and a diversity combination unit for combining the first and the second transversal filtered signals to produce the combined signal.

Such a conventional interference cancellation apparatus is disclosed in "MMSE Equalization of Interference on Fading Diversity Channels", Peter Monsen, IEEE Transactions on Communications, VOL. COM-32, No. 1, January 1984.

However, it still remains as an unsolved problem that the conventional interference cancellation apparatus has defects with respect to an algorithm and a speed of the adaptive equalization. In fact, the conventional interference cancellation apparatus is subjected to disturbing or jamming waves sent from a flying object in addition to the interference from adjacent channels.

In such a case, a changing speed of the interference waves becomes larger than that of the fading. As a result, it becomes difficult that removal of the interference and multipath distortion should be followed in accordance with Least Mean Squares (LMS) algorithm.

It is pointed out by Kojiro Watanabe in a reference ICCC Session No. 46.2.1 "Adaptive Matched Filter and its Significance to Anti-Multipath Fading" that the conventional interference cancellation apparatus proposed by Peter Monsen cannot be operable at a high convergence speed.

SUMMARY OF THE INVENTION

It is therefore an object of this invention to provide an interference cancellation apparatus which can be operable at a high convergence speed.

Other objects of this invention will become clear as the description proceeds.

On describing the gist of the present invention, it should at first be understood that an interference cancellation apparatus is for use in combination with a diversity receiving system which has first and second diversity routes, the apparatus being supplied with first and second diversity reception signals corresponding to the first and the second diversity routes and being operable as a decision feedback equalizer to produce an equalized signal.

According to this invention, the above-understood interference cancellation apparatus comprises: first and second transversal filter means for filtering the first and the second diversity reception signals into first and second transversal filtered signals in accordance with first and second controllable tap gains, respectively; first and second control means for controlling the first and the second controllable tap gains with reference to a first error signal in accordance with a predetermined adaptive algorithm; third transversal filter means for filtering a decision signal into a third transversal filtered signal in accordance with third controllable tap gains; third control means for controlling the third controllable tap gains with reference to the first error signal in accordance with the predetermined adaptive algorithm; decision means for detecting a level of the equalized signal to decide a decision level for the equalized signal and to produce a decision signal representative of the decision level to supply the decision signal to the third transversal filter means; first error producing means for producing the first error signal indicative of a difference between a subtracted signal and the decision signal, the first error signal being supplied to the first, the second, and the third control means; subtractor means for subtracting the third transversal filtered signal from a combined signal to supply the subtracted signal to the decision means and the first error producing means; and diversity combination means for combining the first and the second transversal filtered signals to produce the combined signal. The diversity combination means comprises; adder means for calculating a total sum of a first complex multiplied signal and a second complex multiplied signal to produce a total sum signal representative of the total sum; first and second complex multiplier means for complexly multiplying the first and the second transversal filtered signals by first and second correlated values and to produce the first and the second complex multiplied signals, respectively; first and second correlation means for correlating the first and the second transversal filtered signals with a second error signal in each of the first and the second diversity routes to produce first and second correlation signals indicative of the first and the second correlated values, respectively; and second error producing means for producing the second error signal indicative of a difference between the total sum signal and the decision signal, the second error signal being supplied to the first and the second correlation means, respectively.

DESCRIPTION OF THE PREFERRED EMBODIMENT

Figure 1:
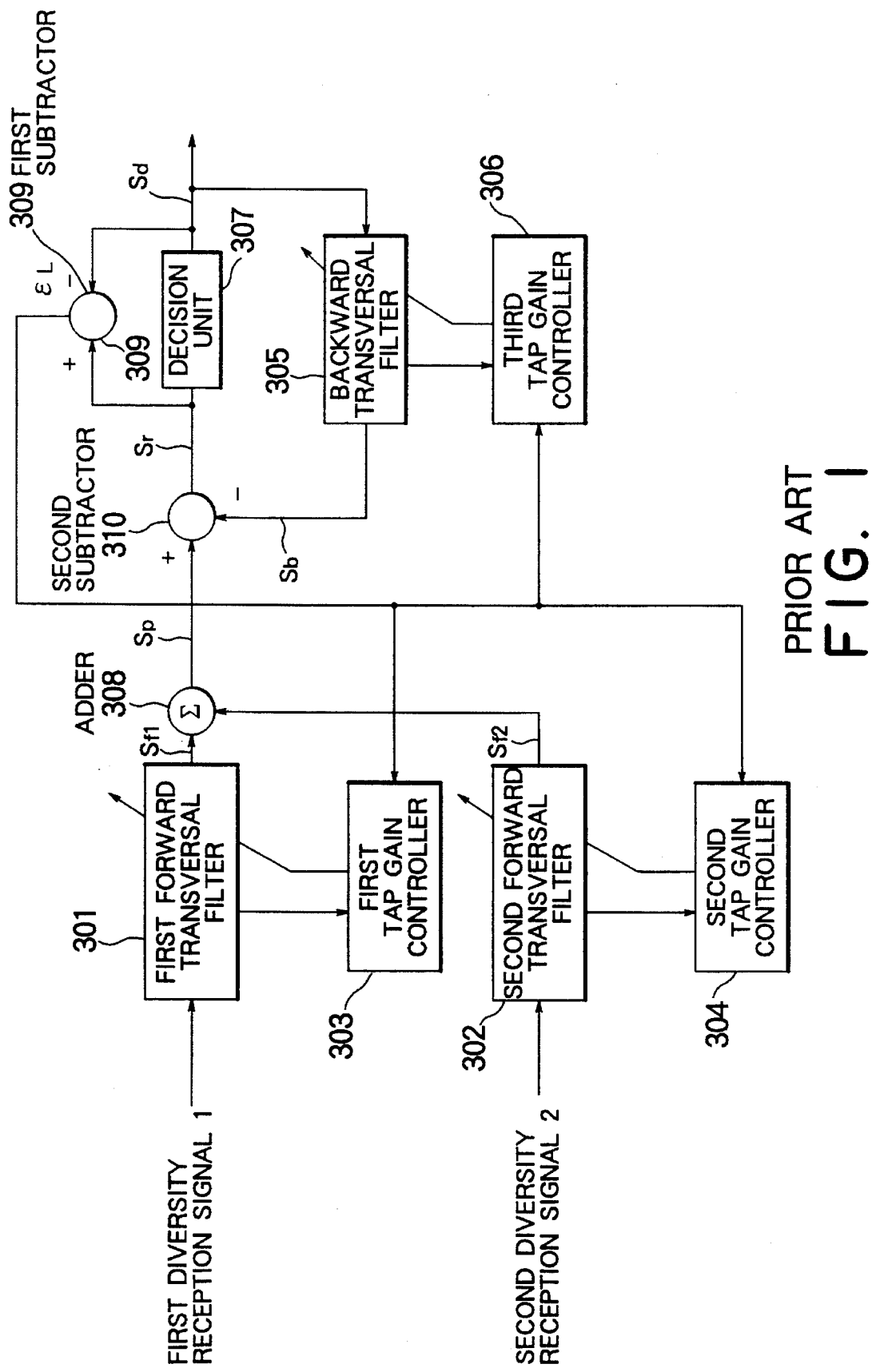
FIG. 1 is a block diagram of a conventional interference cancellation apparatus.

Referring to FIG. 1, description will first be made as regards a conventional interference cancellation apparatus for a better understanding of this invention.

In FIG. 1, illustration is made about a conventional interference cancellation apparatus which is for use in combination with a diversity receiving system which has two diversity routes. Namely, the illustrated conventional interference cancellation apparatus is applied to dual diversity receiving systems. The apparatus is operable as a decision feedback equalizer (DFE) which is supplied with first and second diversity reception signals 1 and 2 corresponding to the diversity routes to produce an equalized signal.

As illustrated in FIG. 1, the conventional interference cancellation apparatus comprises first and second transversal filters (will be called hereinunder first and second forward transversal filters) 301 and 302 each of which has a plurality of controllable taps and which filter the first and the second diversity reception signals 1 and 2 into first and second transversal filtered signals Sf1 and Sf2 in accordance with first and second controllable tap gains, respectively, first and second tap gain controllers 303 and 304 for controlling the first and the second controllable tap gains with reference to an error signal $\epsilon_L$ and a distributed signal distributed in each one of the taps in accordance with a predetermined adaptive algorithm, such as minimum means square error (MMSE) algorithm, third transversal filter (hereinunder called backward transversal filter) 305 which has a plurality of taps and which filters a decision signal $S_d$ into a third transversal filtered signal $S_b$ in accordance with third controllable tap gains, third tap gain controller 306 for controlling the third controllable tap gains with reference to the error signal $\epsilon_L$ and a distributed signal distributed in each tap in accordance with the predetermined adaptive algorithm, a decision unit 307 for detecting a level of the equalized signal to decide a decision level for the equalized signal and to produce the decision signal $S_d$ representative of the decision level to supply the decision signal $S_d$ to the backward transversal filter 305, an error producing unit, such as a subtractor (hereinunder called a first subtractor) 309 for producing the error signal $\epsilon_L$ which is indicative of a difference between a subtracted signal $S_r$ and the decision signal $S_d$ and which is supplied to the first, the second, and the third tap gain controllers 303, 304, and 306, a subtractor (hereinunder called a second subtractor) 310 for subtracting the third transversal filtered signal $S_b$ from a combined signal $S_p$ to supply the subtracted signal $S_r$ to the decision unit 307 and the first subtractor 309, and a diversity combination unit, such as an adder (hereinunder called an adder) 308 for combining the first and the second transversal filtered signals Sf1 and Sf2 to produce the combined signal $S_p$.

The first and the second forward transversal filters 301 and 302 are connected to respective analog to digital (A/D) converters, demodulators, and the like corresponding to respective diversity routes, although they are not shown in FIG. 1.

Description will hereinunder proceed to an operation of the interference cancellation apparatus illustrated in FIG. 1.

Like a general decision feedback equalizer, in the interference cancellation apparatus, a pre-cursor distortion is removed by the first or the second forward transversal filter 301 or 302 while a backward cursor distortion is removed by the backward transversal filter 305. Namely, the first diversity reception signal 1 is deprived of its pre-cursor distortion by the first forward transversal filter 301 to produce the first transversal filtered signal $S_{f1}$ while the second diversity reception signal 2 is deprived of its pre-cursor distortion by the second forward transversal filter 302 to produce the second transversal filtered signal $S_{f2}$. The first and the second transversal filtered signals $S_{f1}$ and $S_{f2}$ are combined by the adder 308 to produce the combined signal $S_p$.

The decision signal $S_d$ is supplied to the backward transversal filter 305. In the backward transversal filter 305, a backward cursor distortion remained in the diversity combined signal $S_p$ is assumed by the backward transversal filter 305. The diversity combined signal $S_p$ is deprived of the assumed post-cursor distortion by the second subtractor 310 to produce a diversity combined and subtracted signal Sr. Thus, an adaptive equalization means an operation for removing multi-path intersymbol interference against variable impulse responses. On the other hand, each tap gain is controlled by the first and the second tap gain controllers 303 and 304 and by the third tap gain controller 306 in accordance with a predetermined algorithm by the use of the error signal $\epsilon_L$ and distributed signals distributed in each tap of the first and the second forward transversal filters 301 and 302, and the backward transversal filter 305.

The error signal $\epsilon_L$ is indicative of a difference between an input and an output of the decision unit 307.

In the interim, such a conventional interference cancellation apparatus is included in a diversity receiver which is for use in a fast digital transmission (10M bps) on such multi-path fading channels as represented by tropospheric scatter propagation. Under such circumstances, a changing speed of the fading is very small when compared with the above-referred transmission speed. In the conventional interference cancellation apparatus used in such circumstances, control of the tap gain is generally carried out in accordance with Least Mean Squares (LMS) algorithm. With this LMS algorithm, provided that a tap gain at a certain sampling time n is $C^n$, a tap gain at a sampling time n+1 is adjusted by the equation (1):

$$C^{n+1} = C^n - \mu \epsilon^n u^n, \tag{1}$$

where μ represents an adjusting factor, and $\epsilon^n$ represents the first error signal at the sampling time n while $u^n$ represents the distributed signal distributed in each tap.

In the conventional interference cancellation apparatus as illustrated in FIG. 1, interference cancellation is effectively carried out, when broad-band interfering waves are present independent from desired signal waves on multi-path fading environments, as described in the above-mentioned reference. This is based on that such a diversity system is operable as a kind of power inversion adaptive array and so that diversity signals are combined to countervail the interfering waves each other between the diversity routes. In this case, since the diversity system is operable not as a signal reinforcing system originally expected thereto but as an interference cancellation system, explicit diversity effect cannot be achieved. On the other hand, since signal components delayed and dispersed through multipath dispersion are converged with maximum ratio combination at time domain by the first and the second forward transversal filters 301 and 302, implicit diversity effect can be reserved. By controlling the first and the second forward transversal filters 301 and 302, and the backward transversal filter 305 in accordance with minimum means square error (MMSE) algorithm for minimizing an average of square of the above-mentioned error signals, the power inversion interference cancellation as well as the matching filter adaptive equalization can be comprehensively carried out in the signal processing.

However, as mentioned in the preamble of the instant specification, it still remains as an unsolved problem that the conventional interference cancellation apparatus has defects with respect to an algorithm and a speed of the adaptive equalization. In fact, the conventional interference cancellation apparatus is subjected to disturbing or jamming waves sent from a flying object in addition to the interference from adjacent channels. In such a case, a changing speed of the interference waves becomes larger than that of the fading. As a result, it becomes difficult that removal of the interference and multipath distortion should be followed in accordance with the above-mentioned LMS algorithm.

It is pointed out by Kojiro Watanabe in a reference ICCC Session No. 46.2.1 "Adaptive Matched Filter and its Significance to Anti-Multipath Fading" that the conventional interference cancellation apparatus proposed by Peter Monsen is not operable at a high convergence speed. The reason is that the LMS algorithm with a use of the first error signal is applied to all the taps of the first and the second forward transversal filters 301 and 302, and the backward transversal filter 305 and so that the correlated matrix becomes large in size.

Furthermore, each eigenvalue in the correlated matrix becomes far uneven when the interfering waves are supplied to the conventional interference cancellation apparatus in addition that the convergence speed of the conventional adaptive interference cancellation apparatus is small. In this case, it becomes more serious that the adaptive convergence speed is small.

In order to solve this problem, Peter Monsen refers to in the above-mentioned reference an application of Kalman algorithm as one of the adaptive algorithms. However, it causes another problem of too much time of computing to apply the Kalman algorithm, since it requires complicated processing. Accordingly, it is at present difficult for the Kalman algorithm to be applied to fast transmission system.

Figure 2:
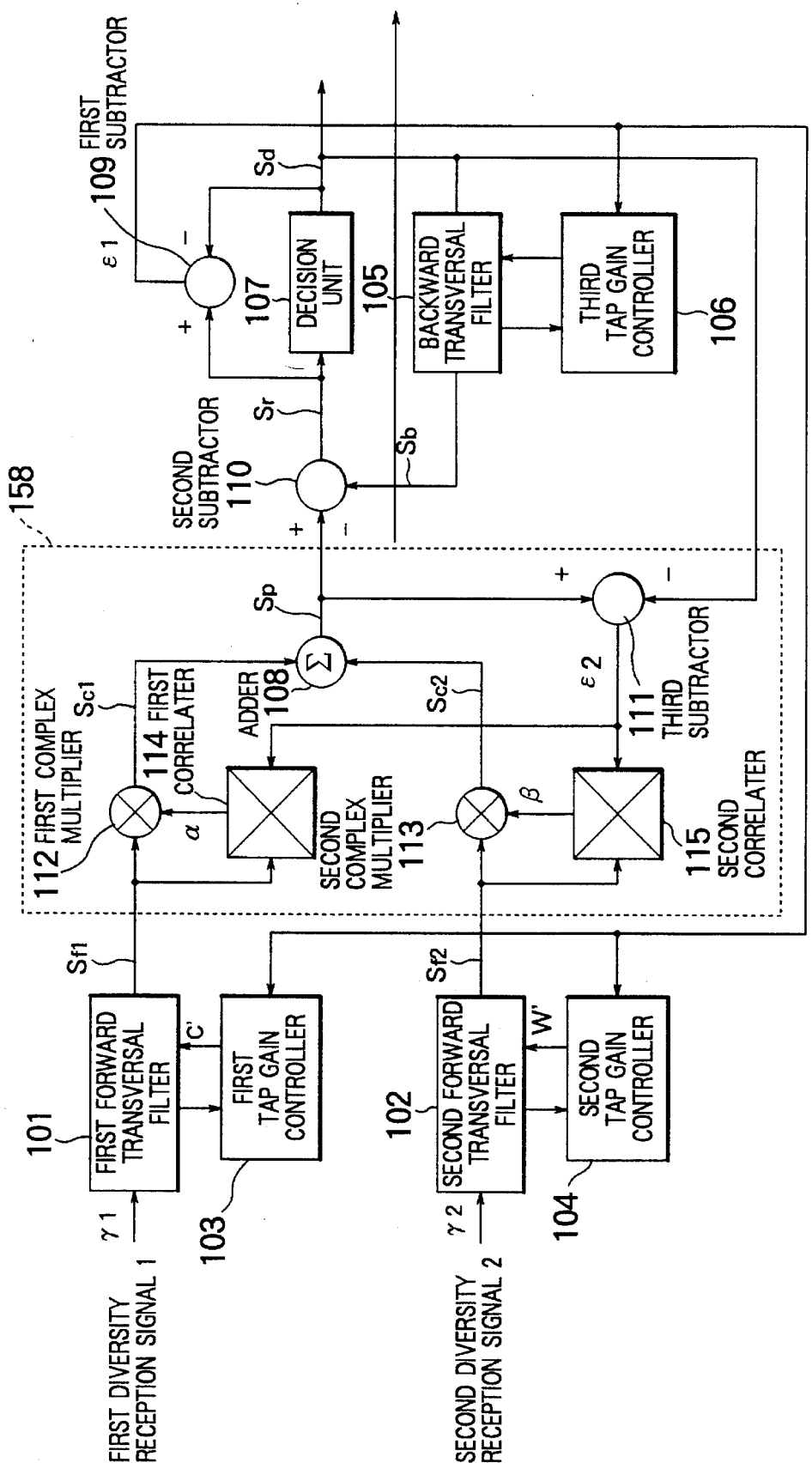
FIG. 2 is a block diagram of an interference cancellation apparatus according to an embodiment of this invention.
Figure 3:
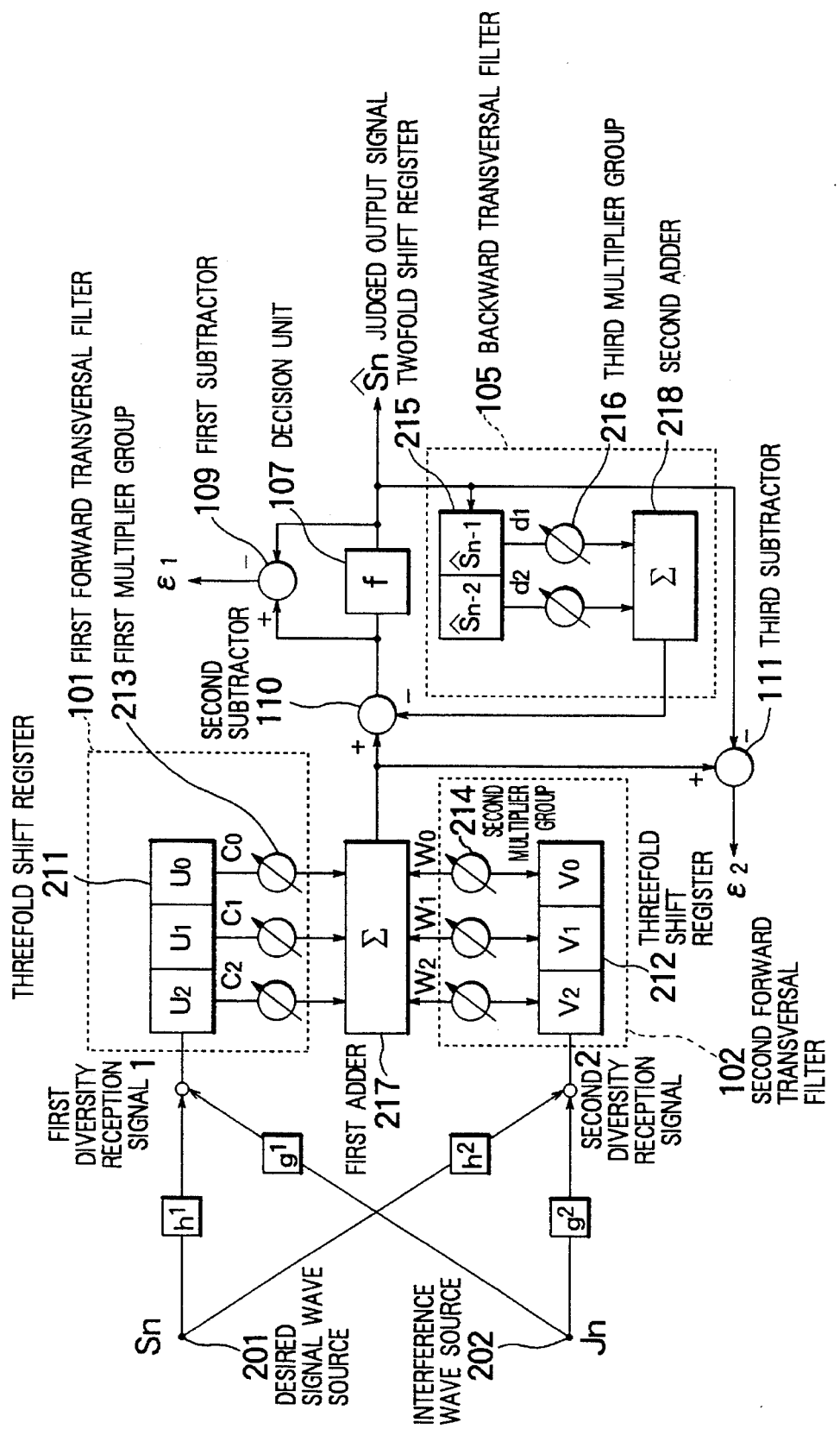
FIG. 3 is a block diagram for use in describing an operation of the interference cancellation apparatus illustrated in FIG. 2.

Referring to FIGS. 2 and 3, description will proceed to an interference cancellation apparatus according to a preferred embodiment of this invention.

The illustrated interference cancellation apparatus comprises similar parts which are operable with likewise named signals.

In FIGS. 2 and 3, illustration is made about the interference cancellation apparatus which is for use in combination with a diversity receiving system which has two diversity routes. Namely, the illustrated interference cancellation apparatus is applied to dual diversity receiving system, as is similar to the conventional one illustrated in FIG. 1. Like the conventional one, the apparatus is operable as a decision feedback equalizer (DFE) which is supplied with first and second diversity reception signals 1 and 2 corresponding to the diversity routes to produce an equalized signal.

As illustrated in FIG. 2, the interference cancellation apparatus comprises first and second forward transversal filters 101 and 102 which have a plurality of first and second taps, the first and the second forward transversal filters 101 and 102 filtering the first and the second diversity reception signals 1 and 2 into first and second transversal filtered signals $Sf_1$ and $Sf_2$ in accordance with first and second controllable tap gains, respectively, first and second tap gain controllers 103 and 104 for controlling the first and the second controllable tap gains with reference to a first error signal $\epsilon_1$ and a distributed signal distributed in each one of the first and the second taps in accordance with a predetermined adaptive algorithm, such as minimum mean square error (MMSE) algorithm; a backward transversal filter 105 which has a plurality of third taps and which filters a decision signal $S_d$ into a third transversal filtered signal $S_b$ in accordance with third controllable tap gains; third tap gain controller 106 for controlling the third controllable tap gains with reference to the first error signal 1 and a third distributed signal distributed in each of the third taps in accordance with the predetermined adaptive algorithm; a decision unit 107 for detecting a level of the equalized signal to decide a decision level for the equalized signal and to produce a decision signal $S_d$ representative of the decision level to supply the decision signal $S_d$ to the backward transversal filter 105; a first error producing unit, such as a subtractor (hereinunder called a first subtractor) 109 for producing the first error signal $\epsilon_1$ indicative of a difference between the subtracted signal $S_r$ and the decision signal $S_d$, the first error signal $\epsilon_1$ being supplied to the first, the second, and the third tap gain controllers 103, 104, and 106; a second subtractor 110 for subtracting the third transversal filtered signal $S_b$ from the combined signal $S_p$ to supply the subtracted signal $S_r$ to the decision unit 107 and the first subtractor 109; and a diversity combining section 158 for combining the first and the second transversal filtered signals $Sf_1$ and $Sf_2$ to produce a combined signal Sp.

The diversity combining section 158 comprises an adder 108 for calculating a total sum of a first complex multiplied signal $Sc_1$ and a second complex multiplied signal $Sc_2$ to produce a total sum signal $S_p$ representative of the total sum; first and second complex multipliers 112 and 113 for complexly multiplying the first and the second transversal filtered signals $Sf_1$ and $Sf_2$ by the first and the second correlated values $\alpha$ and $\beta$ to produce first and second complex multiplied signals $Sc_1$ and $Sc_2$, respectively; first and second correlators 114 and 115 for correlating the first and the second transversal filtered signals $Sf_1$ and $Sf_2$ with a second error signal $\epsilon_2$ in each of the first and the second diversity routes to produce first and second correlation signals indicative of the first and the second correlated values $\alpha$ and $\beta$, respectively; and a second error producing unit, such as a subtractor (hereinunder called a third subtractor) 111 for producing the second error signal $\epsilon_2$ indicative of a difference between the total sum signal $S_p$ and the decision signal $S_d$, the second error signal $\epsilon_2$ being supplied to the first and the second correlators 114 and 115, respectively.

In this preferred embodiment, the above-mentioned equalized signal is a multilevel signal having a plurality of levels greater than two. The decision unit 107 detects which one of the levels the multilevel signal has as a decision level to produce a decision signal representative of the decision level.

The first and the second forward transversal filters 101 and 102 are connected to respective analog to digital (A/D) converters, demodulators, and the like corresponding to respective diversity routes, although they are not shown in FIG. 2.

Description will hereinunder proceed to an operation of the interference cancellation apparatus illustrated in FIG. 2.

Supplied with the first and the second diversity reception signals 1 and 2, the first and the second forward transversal filters 101 and 102 produces the first and the second transversal filtered signals $S_{f1}$ and $S_{f2}$ which are deprived of each pre-cursor distortion thereby, respectively. The first and the second transversal filtered signals $S_{f1}$ and $S_{f2}$ are diversity combined by the diversity combining section 158 to produce a diversity combined signal Sp. The backward transversal filter 105 produces a third transversal filtered signal $S_b$ which is deprived of its post-cursor distortion thereby in response to a decision signal $S_d$ from the decision unit 107. From the diversity combined signal $S_p$, the third transversal filtered signal $S_b$ is subtracted by the second subtractor 110 to produce the subtracted signal $S_r$. In response to the subtracted signal $S_r$, the decision unit 107 produces the decision signal $S_d$ and supplies the decision signal $S_d$ to the backward transversal filter 105 as an input signal. The first subtractor 109 calculates a difference between input and output signals of the decision unit 107, namely, the difference between the subtracted signal $S_r$ and the decision signal $S_d$, to produce the first error signal $\epsilon_1$. In response to the first error signal $\epsilon_1$, the first and the second tap gain controllers 103 and 104 adjust each tap factor of the first and the second transversal filtered signals $S_{f1}$ and $S_{f2}$. The third tap gain controller 106 adjusts a tap factor of the third transversal filtered signal $S_b$ in response to the first error signal $\epsilon_1$. Supplied with the first and the second transversal filtered signals $S_{f1}$ and $S_{f2}$ through each diversity route, the first and the second complex multipliers 112 and 113 carry out each complex multiply to produce first and second complex multiplied signals $Sc_1$ and $Sc_2$. The third subtractors 111 calculates a difference between the diversity combined signal $S_p$ and the decision signal $S_d$ to produce the second error signal $\epsilon_2$. The first and the second correlators 114 and 115 correlate the second error signal $\epsilon_2$ and the first and the second transversal filtered signals $S_{f1}$ and $S_{f2}$ through each diversity route to produce first and second correlation signals indicative of the first and the second correlated values $\alpha$ and $\beta$. The first and the second correlation signals are supplied to the first and the second complex multipliers 112 and 113 through each diversity route. The first and the second complex multipliers 112 and 113 carry out each complex multiply between the first and the second correlated values $\alpha$ and $\beta$ and the first and the second transversal filtered signals $S_{f1}$ and $S_{f2}$ to produce the first and the second complex multiplied signals $Sc_1$ and $S_{c2}$.

Referring to FIG. 3, description will proceed to an operation of the interference cancellation apparatus illustrated in FIG. 2.

In FIG. 3, illustrated are desired signal wave source 201 having a sampling value $S_n$, an interference wave source 202 having a sampling value $J_n$, an impulse response $h^1$ in the transmission system responsive to the first diversity reception signal 1 at the sampling value $S_n$, an impulse response $h^2$ in the transmission system responsive to the second diversity reception signal 2 at the sampling value $S_n$, an impulse response $g^1$ in the transmission system responsive to the first diversity reception signal 1 at the sampling value $J_n$, an impulse response $g^2$ in the transmission system responsive to the second diversity reception signal 2 at the sampling value $J_n$, threefold shift registers 211 and 212 each of which has T/2 interval (T: symbolic cycle), first and second multiplier groups 213 and 214 each of which consists of three multipliers, a twofold shift register 215 which has T interval, a third multiplier group 216 which consists of two multipliers, first and second adders 217 and 218, a decision unit 107, first, second, and third subtractors 109, 110, and 111. Besides, first, second, and third tap gain controllers 103, 104, and 106 are present, like in FIG. 2, although they are not shown in FIG. 3.

Herein, it is assumed that tap factor vectors produced by the first and the second tap gain controllers 103 and 104 are depicted by C' and W', respectively.

The first diversity reception signal 1 is defined as a first input signal $r_1$ in FIG. 2. The $r_1$ is multiplied with the tap factor vector C' by the convolution processing on the first forward transversal filter 101. As a result, the first transversal filtered signal $S_{f1}$ comes to be representative of $r_1 * C'$. The first transversal filtered signal $S_{f1}$ is then multiplied with the tap factor $\alpha$ on the first complex multiplier 112. Consequently, the first complex multiplied signal $Sc_1$ comes to be representative of $r_1 * \alpha C'$. On the other hand, the second diversity reception signal 2 is defined as a second input signal $r_2$ in FIG. 2. The $r_2$ is multiplied with the tap factor vector W' by the convolution processing on the second forward transversal filter 102. As a result, the second transversal filtered signal $S_{f2}$ comes to be representative of $r_2 * W'$. The second transversal filtered signal $S_{f2}$ is then multiplied with the tap factor $\beta$ on the second complex multiplier 113. Consequently, the second complex multiplied signal $Sc_2$ comes to be representative of $r_2 * \beta W'$. This means that the first and the second complex multipliers 112 and 113 can be omitted, provided that the tap factor vectors C' and W' are multiplied with the tap factors $\alpha$ and $\beta$, respectively.

With this block diagram illustrated in FIG. 3, the following equations (2) and (3) are concluded.

$$C^T = [C_0\ C_1\ C_2] \underline{\Delta} \alpha C = \alpha[C_0'\ C_1'\ C_2'] \tag{2}$$

$$W^T = [W_0\ W_1\ W_2] \underline{\Delta} \beta W = \beta[W_0'\ W_1'\ W_2'] \tag{3}$$

where $C^T$ and $W^T$ should be new tap factor vectors C and W produced by the first and the second tap gain controllers 103 and 104. Accordingly, the first and the second complex multipliers 112 and 113 as well as the first and the second correlators 114 and 115 are omitted in FIG. 3.

In FIG. 3, it is assumed that the desired wave signals $201(S_n)$ and $202(J_n)$ are broad-band modulated signals independent from each other, and that mutual correlation between symbols which are spaced from each other by more than one symbol is null. It is also assumed that Rayleigh fadings which are independent from each other are added to the impulse responses $h^1$, $h^2$, $g^1$, and $g^2$.

In the interim, according to the above-mentioned conventional interference cancellation apparatus, i.e., Monsen's system, all tap factors of the DFE illustrated in FIG. 3 are controlled so that the means square error of the first error signal $\epsilon_1$ may be minimized. In such a case, a normal (Wiener hopf) equalizations in which each tap factor is an unknown quantity are represented by the following equations (4), (5), (6), (7), and (8).

$$\begin{bmatrix} R_{11} & R_{12} & -H_1 \\ R_{21} & R_{22} & -H_2 \\ H_1^{T*} & H_2^{T*} & I \end{bmatrix} \begin{bmatrix} C \\ W \\ D \end{bmatrix} = \begin{bmatrix} h^1 \\ h^2 \\ 0 \end{bmatrix} \tag{4}$$

where T represents transposition while * represents complex conjugate, and where I represents a unit matrix of 2×2.

$$R_{lm} = \begin{bmatrix} R_{lm}(0) & R_{lm}(+1) & R_{lm}(+2) \\ R_{lm}(-1) & R_{lm}(0) & R_{lm}(+1) \\ R_{lm}(2) & R_{lm}(-1) & R_{lm}(0) \end{bmatrix} \tag{5}$$

-continued $$R_{lm}(K) = \sum_{n=-\infty}^{+\infty} (h_n^l h_{n-k}^{m*} + g_n^l g_{n-k}^{m*}) \quad (6)$$

where $h^1_n$ represents a sampling value of the impulse response $h^1$ (l=1, 2) at the time n.

$$H_1 = \begin{bmatrix} h_1^{1*} & h_2^{1*} \\ h_2^{1*} & h_3^{1*} \\ h_3^{1*} & h_4^{1*} \end{bmatrix} \quad (7)$$

$$H_2 = \begin{bmatrix} h_1^{2*} & h_2^{2*} \\ h_2^{2*} & h_3^{2*} \\ h_3^{2*} & h_4^{2*} \end{bmatrix} \quad (8)$$

In the above-depicted equation (4), C, W, D represent tap factor vectors of the first and the second forward transversal filters 101 and 102, and the backward transversal filter 105, respectively. Each of C, W, D is represented by the following equation (9). On the other hand, $h^1$ and $h^2$ represent sampling value vectors of impulse responses $h^1$ and $h^2$, respectively. Each of $h^1$ and $h^2$ is represented by the following equation (10).

$$C^T = [C_0 \; C_1 \; C_2] \; W^T = [W_0 \; W_1 \; W_2] \; D^T = [d_1 \; d_2] \quad (9)$$

$$h^1 = [h^{1*}_0 \; h^{1*}_1 \; h^{1*}_2], \; h^2 = [h^{2*}_0 \; h^{2*}_1 \; h^{2*}_2] \quad (10)$$

In the above-depicted equation (4), the left-side of the normal equation is a correlated matrix of the Monsen's DFE. The correlated matrix of the Monsen's DFE is 8×8 in size, when applied to the system illustrated in FIG. 3. When the tap gain control is carried out in accordance with a maximum dividing method or the LMS algorithm, a performance function $\xi$ at the time n based on mean square value of the first error signal is represented by the following equation (11).

$$\xi_n = \xi_{min} + \sum_{i=1}^{8} (\Delta_0^T q_i)^2 \lambda_i \left\{ \prod_{k=1}^{n} (1 - \mu \lambda_i)^2 \right\} \quad (11)$$

where $\xi_{min}$ represents a critical minimum value of the performance function, $\Delta_0$ represents an error vector between an initial value and an ideal solution concerning all the taps, $q_i$ represents an intrinsic vector concerning the tap of i turn, $\lambda_i$ represents an eigenvalue in the correlated matrix of 8×8, and $\mu$ represents a tap adjusting factor in the LMS algorithm. As clearly understood from the equation (10), the correlated matrix becomes larger in size, as the degrees of the diversity routes or numbers of the filter taps are increased. Consequently, the convergence time until mean square error is minimized becomes longer. Particularly, the convergence time is deteriorated, when the eigenvalue $\lambda_i$ becomes uneven.

On the contrary, according to the preferred embodiment of the present invention, there is introduced the second error signal 2 produced by the third subtractor 111, as illustrated in FIG. 2. Consequently, there is introduced a secondary MMSE correlated loop which comprises the first and the second correlators 114 and 115, and the first and the second complex multipliers 112 and 113 in addition to the primary MMSE correlated loop. In other words, tap factors $\alpha$ and $\beta$ multiplied by the first and the second complex multipliers 112 and 113 are sequentially renewed so that mean square value of the second error signal $\epsilon_2$ may be minimized. The secondary MMSE correlated loop is equal to an LMS correlated loop which is often used in an adaptive array. The secondary MMSE correlated loop is similar in operation to a nulling in an antenna pattern against undesired interfering and disturbing waves. Namely, in the secondary MMSE correlated loop, the tap factors $\alpha$ and $\beta$ are controlled so that interfering waves in diversity routes may be cancelled each other at a reciprocal condition. In particular, the LMS array provides a fast convergence characteristic under such severe circumstances that desired to undesired signals ratio (D/U) comes to be negative. Further, in the presence of interfering and disturbing waves as well as multipath distortion, the secondary MMSE correlated loop responses more sensitively to the interfering and disturbing waves than to the multipath distortion. The reason is that the first and the second complex multipliers 112 and 113 are not transversal filters and so that operations of the first and the second complex multipliers 112 and 113 are restricted to a control of amplitudes and phases of the diversity input signals. In other words, the first and the second complex multipliers 112 and 113 are not capable of such a transversal filtering adaptive equalization. The first and the second complex multipliers 112 and 113 are absorbed in an anti-phase combination of the interfering and disturbing waves.

Therefore, in the primary MMSE correlated loop with the first error signal $\epsilon_1$, there is carried out an adjustment of the tap factors of the first and the second forward transversal filters 101 and 102, and the backward transversal filter 105 so that multipath distortion due to variable elements $h^1$ and $g^2$ in the propagation paths may be removed. On the other hand, in the secondary MMSE correlated loop with the second error signal $\epsilon_2$, there is carried out an anti-phase cancellation of received interfering waves which is due to variable elements $h^2$ and $g^1$ in the propagation paths. Thus, the first MMSE control system is for use in the adaptive equalization while the second MMSE control system is for use in the interference cancellation. By assigning each part to the first and the second MMSE control systems, respectively, the adaptive equalization and the interference cancellation can be parallely processed at the same time. Consequently, both the adaptive equalization and the interference cancellation can be carried out at a high speed in the interference cancellation apparatus of the present invention, as compared with the conventional one.

Such an operation of the interference cancellation apparatus of the present invention will be described more in detail.

Generally, when a system has a plurality of control loops, a conflicting problem between the control loops is sometimes caused to happen. In order to solve this problem, the difference of response speed (time constant) should be made between the control loops. For example, the interference cancellation apparatus may be subjected to an environment in which the above-mentioned interfering waves are more fastly variable than the multipath waves. When the interference cancellation apparatus is subjected to such an environment, the response speed of the second MMSE control system should be predetermined to be larger than that of the first MMSE control system. Namely, the adjusting factor of the second MMSE control system should be made larger than that of the first MMSE control system, with respect to algorithms, such as the aforesaid LMS algorithm, for adjusting the tap factors. Thereby, it becomes possible that cancellation of the interfering waves is set up faster than the adaptive equalization and that the control of the adaptive equalization is converged after the cancellation of the interfering waves is finished. In this event, it becomes sufficient that the above-mentioned tap factors C' and W' are converged in a solution for the removal of the multipath distortion. In other words, it becomes possible that the correlated factors $g^1_n g^{m*}_{n-k}$ due to the interfering waves are deleted from the above-depicted correlated matrixes in the equations (5) and (6). This means that the electric power of the interfering waves can be deleted from the electric power in the correlated matrix $R_{1m}$ and so that an eigenvalue corresponding to the electric power in the correlated matrix $R_{1m}$ becomes small.

A component indicating such electric power in a correlated matrix is generally called a "trace". The "trace" is defined by the equation (12).

$$tr[R] = \sum_{i=1}^{N} \lambda_i \tag{12}$$

As clearly understood from the above equation (12), reception power is reduced, as the eigenvalue becomes small.

On the other hand, an MMSE control system with an LMS algorithm must comply with the following inequality (13) so as to be converged.

$$0<\mu<(2/tr[R]) \tag{13}$$

In a case that a value of the above-mentioned adjusting factors exceeds the right part, (2/tr[R]), in the above inequality (13), the MMSE control is not converged but diverged. The reason is physically explained as follows.

When the eigenvalue in the correlated matrix $R_{lm}$ becomes large due to large electric power of the interfering waves, a value of the right part, (2/tr[R]) in the inequality (13) becomes small. Under such circumstances, a value of the adjusting factor μ must be kept small so that the MMSE control system may comply with the inequality (13) to be converged. However, the adaptive equalization becomes slow, when the adjusting factor μ is kept small. As a result, a convergence performance of the MMSE control system is deteriorated.

Since the interfering waves are cancelled by the second MMSE control loop in the preferred embodiment of the present invention, it is possible that the eigenvalue is decreased by the quantity of the electric power of the interfering waves. Consequently, it is possible that the value of the right part, (2/tr[R]) in the inequality (13) becomes large. It is therefore not necessary that the adjusting factor μ in the first MMSE control system is made too small. Accordingly, the convergence performance of the first MMSE control system is not so deteriorated.

As explained above, the adaptive equalization and the interference cancellation are processed in parallel by the first and the second MMSE control systems, so that the control of the adaptive equalization and the interference cancellation can be converged at a high speed. As a result, an excellent performance of both the adaptive equalization and the interference cancellation is achieved with respect not only to interferring waves which are variable faster than those of multipath fading but also to interfering waves by which the aforesaid D/U ratio becomes negative.

While this invention has thus far been described in conjunction with a preferred embodiment thereof, it will readily be possible for those skilled in the art to put this invention into practice in various other manners. For example, the equalized signal may be a binary signal specified by a binary level. In this case, the decision unit 107 detects whether or not the binary level of the equalized signal exceeds a predetermined threshold level to decide a detected binary level for the equalized signal and to produce a decision signal representative of the judged binary level.

What is claimed is:

1. An interference cancellation apparatus for use in combination with a diversity receiving system which has first and second diversity routes, said apparatus being supplied with first and second diversity reception signals corresponding to said first and said second diversity routes and being operable as a decision feedback equalizer to produce an equalized signal, said apparatus comprising:

first transversal filter means which has a plurality of first taps and second transversal filter means which has a plurality of second taps, said first and said second transversal filter means filtering said first and said second diversity reception signals into first and second transversal filtered signals in accordance with first and second controllable tap gains, respectively;

first control means for controlling said first controllable tap gains with reference to a first error signal and a first distributed signal distributed in each one of said first taps in accordance with a predetermined adaptive algorithm;

second control means for controlling said second controllable tap gains with reference to a first error signal and a second distributed signal distributed in each one of said second taps in accordance with said predetermined adaptive algorithm;

third transversal filter means which has a plurality of third taps and which filters a decision signal into a third transversal filtered signal in accordance with third controllable tap gains;

third control means for controlling said third controllable tap gains with reference to said first error signal and a third distributed signal distributed in each of said third taps in accordance with said predetermined adaptive algorithm;

decision means for detecting a level of said equalized signal to decide a decision level for said equalized signal and to produce a decision signal representative of said decision level to supply said decision signal to said third transversal filter means;

first error producing means for producing said first error signal indicative of a difference between said equalized signal and said decision signal, said first error signal being supplied to said first, said second and said third control means;

a subtractor means for subtracting said third transversal filtered signal from a combined signal to supply a subtracted signal to said decision means and said first error producing means as said equalized signal; and diversity combining means for combining said first and said second transversal filtered signals to produce said combined signal;

said diversity combining means comprising:

adder means for calculating a total sum of a first complex multiplied signal and a second complex multiplied signal to produce a total sum signal as said combined signal representative of said total sum;

first and second complex multiplier means for complexly multiplying said first and said second transversal filtered signals by first and second correlated values α and β to produce said first and said second complex multiplied signals, respectively;

first and second correlation means for correlating said first and said second transversal filtered signals with a second error signal in each of said first and said second diversity routes to produce first and second correlation signals indicative of said first and said second correlated values α and β, respectively; and second error producing means for producing said second error signal indicative of a difference between said total sum signal and said decision signal, and second error signal being supplied to said first and said second correlation means, respectively.

2. An interference cancellation apparatus as claimed in claim 1, said equalized signal being a binary signal specified by a binary level, wherein said decision means detects whether or not the binary level of said equalized signal exceeds a predetermined threshold level to decide a detected binary level for said equalized signal and to produce a decision signal representative of said detected binary level.

3. An interference cancellation apparatus as claimed in claim 1, said equalized signal being a multilevel signal having a plurality of levels greater than two, wherein said decision means detects which one of said levels said multilevel signal has as a decision level to produce a decision signal representative of said decision level.

4. An interference cancellation apparatus for use in combination with a diversity receiving system, said apparatus being supplied with first and second diversity reception signals and being operable as a decision feedback equalizer to produce an equalized signal, said apparatus comprising:

first and second transversal filter means for filtering said first and said second diversity reception signals into first and second transversal filtered signals in accordance with first and second controllable tap gains, respectively;

first and second control means for controlling said first and said second controllable tap gains with reference to a first error signal in accordance with a predetermined adaptive algorithm;

third transversal filter means for filtering a decision signal into a third transversal filtered signal in accordance with third controllable tap gains;

third control means for controlling said third controllable tap gains with reference to said first error signal in accordance with said predetermined adaptive algorithm;

decision means for detecting a level of said equalized signal to decide a decision level for said equalized signal and to produce a decision signal representative of said decision level to supply said decision signal to said third transversal filter means;

first error producing means for producing said first error signal indicative of a difference between said equalized signal and said decision signal, said first error signal being supplied to said first, said second, and said third control means;

subtractor means for subtracting said third transversal filtered signal from a combined signal to supply a subtracted signal to said decision means and said first error producing means as said equalized signal;

diversity combining means for combining said first and said second transversal filtered signals to produce said combined signal;

said first and said second transversal filter means, first and second control means, third transversal filter means, third control means, decision means, first error producing means, and subtractor means being operable as a first control loop for controlling said first and said second controllable tap gains and said third controllable tap gains with reference to said first error signal; and said diversity combining means comprising a second control loop for controlling said combined signal with reference to a difference between said combined signal and said decision signal.

5. An interference cancellation apparatus as claimed in claim 4, said predetermined adaptive algorithm being minimum mean square error algorithm, wherein said second control loop is operated in accordance with an additional predetermined adaptive algorithm of the minimum mean square error algorithm.

6. An interference cancellation apparatus for use in combination with a diversity receiving system, said apparatus being supplied with first and second diversity reception signals and being operable as a decision feedback equalizer to produced an equalized signal, said apparatus comprising:

first and second transversal filter means for filtering said first and said second diversity reception signals into first and second transversal filtered signals in accordance with first and second controllable tap gains, respectively;

first and second control means for controlling said first and said second controllable tap gains with reference to a first error signal in accordance with a predetermined adaptive algorithm;

third transversal filter means for filtering a decision signal into a third transversal filtered signal in accordance with third controllable tap gains;

third control means for controlling said third controllable tap gains with reference to said first error signal in accordance with said predetermined adaptive algorithm;

decision means for detecting a level of said equalized signal to decide a decision level for said equalized signal and to produce a decision signal representative of said decision level to supply said decision signal to said third transversal filter means;

first error producing means for producing said first error signal indicative of a difference between said equalized signal and said decision signal, said first error signal being supplied to said first, said second, and said third control means;

subtractor means for subtracting said third transversal filtered signal from a combined signal to supply a subtracted signal to said decision means and said first error producing means as said equalized signal;

diversity combining means for combining said first and said second transversal filtered signals to produce said combined signal;

said first and said second transversal filter means, first and second control means, third transversal filter means, third control means, decision means, first error producing means, and subtractor means being operable as a first control loop for controlling said first and said second controllable tap gains and said third controllable tap gains with reference to said first error signal; and said diversity combining means functions to control said combined signal with reference to a difference between said combined signal and said decision signal.

* * * * *

UNITED STATES PATENT AND TRADEMARK OFFICE
CERTIFICATE OF CORRECTION

PATENT NO.    : 5,524,125
DATED         : June 4, 1996
INVENTOR(S)   : Ichiro TSUJIMOTO It is certified that error(s) appears in the above-identified patent and that said Letters Patent is hereby corrected as shown below:

Column 7, line 46, delete "$S_{c2}$" and insert --$Sc_2$--.

Column 8, line 33, delete "$W_{o'}$" and insert --$W_{o'}$--.

Column 11, line 13, delete " $\simeq$ " and insert -- $=$ --.

Signed and Sealed this

Third Day of December, 1996

Attest:

BRUCE LEHMAN

*Attesting Officer*    *Commissioner of Patents and Trademarks*